United States Patent [19]

Ferree

[11] Patent Number: 4,817,894
[45] Date of Patent: Apr. 4, 1989

[54] HERMETIC FEEDTHROUGH CHANGE-OUT MODULE DEVICE AND METHOD FOR USE IN A PRESSURIZED SPACECRAFT HULL

[75] Inventor: Herbert E. Ferree, Hempfield Twp., Westmoreland County, Pa.

[73] Assignee: Westinghouse Electric Corp., Pittsburgh, Pa.

[21] Appl. No.: 162,842

[22] Filed: Mar. 2, 1988

[51] Int. Cl.⁴ .................... B64G 1/22; B65D 51/18; F16J 13/00
[52] U.S. Cl. .................... 244/158 R; 220/256
[58] Field of Search ............. 244/1 R, 158 R, 159, 244/129.4, 131; 220/256; 114/201 R, 354, 336; 405/189

[56] References Cited

U.S. PATENT DOCUMENTS

| 1,783,668 | 12/1930 | Ohman et al. | 114/334 |
| 4,384,655 | 5/1983 | Kendall | 220/256 X |

FOREIGN PATENT DOCUMENTS 656971  9/1951  United Kingdom .............. 244/129.4

OTHER PUBLICATIONS

NASA publication entitled "Space Station Viewport Study" JSC-32003, Dec. 1985.

Primary Examiner—Joseph F. Peters, Jr.

[57] ABSTRACT

A hermetic feedthrough change-out module device which can be mounted on a wall of a pressurized vessel includes a mounting base ring attached to the pressurized vessel wall about an access opening therein, and a feedthrough seal module removably mated in sealing relation to the mounting base ring. The seal module is adapted to mount at least one sealable feedthrough connector which is operable for attaching utility components thereto for routing utility services from the exterior to the interior of the pressurized vessel. The module device also includes inner and outer covers. The inner cover is removably mountable in sealing relation to the seal module for sealing off the interior of the pressurized vessel from the seal module and a feedthrough connector when the latter is mounted thereon. The outer cover is removably mountable in sealing relation to the mounting base ring for sealing off the seal module from the exterior of the pressurized vessel. Venting elements are mounted to the inner cover and seal module that are operable respectively for equalizing the pressure at the interior of the pressurized vessel with the pressure between the inner cover and seal module and for equalizing the pressure at the interior of the pressurized vessel with the pressure between the outer cover and seal module.

23 Claims, 2 Drawing Sheets

HERMETIC FEEDTHROUGH CHANGE-OUT MODULE DEVICE AND METHOD FOR USE IN A PRESSURIZED SPACECRAFT HULL

BACKGROUND OF THE INVENTION

1. Field of the Invention

The present invention relates generally to the provision of feedthrough penetrations in hermetically sealed vessels and, more particularly, is concerned with a replaceable feedthrough module device and method of replacing and/or changing the same being adapted for use in a spacecraft to permit change-out or repair without significant air loss.

2. Description of the Prior Art

For carrying out materials research and production in space as well as many other applications requiring a space environment, an industrial space facility is being constructed for launch and initial operation in the early 1990's. The facility is designed to be a reusable, remotely controlled, free-flying space vehicle in low earth orbit. The facility will provide a pressurized shirt-sleeve environment with sustainable power, cooling, and telemetry capabilities.

Plans are for the facility to remain in orbit for an extended time, for instance, 30 years. If the facility is to have a useful lifetime of 30 years in orbit, then it must be maintainable. Thus, the environment of the facility must be controlled and the facility must be capable of regular servicing while in orbit. Specifically, atmosphere and temperature control are required in the interior of the facility to support certain manufacturing processes or experiments, and for man-tended periodic servicing.

Many spacecraft hull penetrations are necessary for supplying electrical signals and power to the interior and for furnishing fluids used for cooling and atmosphere. The most reliable feedthroughs can probably be mounted individually, directly through the pressurized hull of the facility. However, these could not be easily changed or serviced without a major loss of air from the facility. Less reliable feedthroughs need to be changeable by an astronaut or robot since the facility will not be continually man-tended. Certain removable sealed window or viewport concepts have been proposed heretofore; however, none of these appear to be particularly suited for use as a hull penetration for supplying utility services.

Consequently, a need exists for a different approach to a feedthrough concept which will provide effective access with minimum loss of air.

SUMMARY OF THE INVENTION

The present invention provides a hermetic feedthrough change-out module device and replacement method designed to satisfy the aforementioned needs. The module device of the present invention is particularly adapted for use in the pressurized hull of a spacecraft, such as the above industrial space facility. However, it is also applicable to other hermetically sealed vessels which require that electrical power, fluid, or motion be transmitted through the vessel wall and which have a need for at least periodic serviceability.

The module device of the present invention includes a fixed mounting member and a removable module member which matingly seals to the fixed mounting member such that the module member can be removed for repair or replacement if a fault occurs. Also, the module device includes inner and outer covers. The inner cover is provided inside to stop a leak, whereas the outer cover is provided outside to seal the pressurized hull opening during change-out or repair.

The module device is designed for service either by an astronaut or by a robot. The device will permit change-out or repair without significant air loss. However, it will require the disconnection of lines to the module device. This should not be a serious inconvenience, however, since in most instances the service would occur while the facility is docked to a space shuttle for re-supply.

Accordingly, the present invention is directed to a hermetic feedthrough change-out module device for mounting in an access opening in a wall of a pressurized vessel. The module device includes (a) a mounting member attachable to the pressurized vessel wall about the opening therein; (b) a module member removably matable in sealing relation to the mounting member, the module member being adapted to mount at least one sealable feedthrough connector which is operable for attaching utility components thereto for routing utility services from the exterior to the interior of the pressurized vessel; (c) an inner cover removably mountable in sealing relation to the module member for sealing off the interior of the pressurized vessel from the module member and the feedthrough connector when the latter is mounted on the module member; and (d) an outer cover removably mountable in sealing relation to the mounting member for sealing off the module member from the exterior of the pressurized vessel.

Further, the module device includes first venting means mounted to the inner cover and being operable for equalizing the pressure between the inner cover and the module member with the pressure of the interior of the pressurized vessel. Also, the module device includes second venting means mounted to the module member and being operable for equalizing the pressure between the outer cover and the module member with the pressure of the interior of the pressurized vessel. Still further, gripping and tethering means are attached on each of the inner and outer covers and the module member for securing them so as to prevent them from drifting away when in a weightless space environment.

The present invention also relates to a method of replacing and/or changing a hermetic feedthrough change-out module device. The method includes the steps of: (a) providing a mounting member being fixedly attached to a wall of a pressurized vessel and extending about an access hole therein; (b) removably and sealably mounting a module member to the mounting member so as to sealably close the access hole through the pressure vessel wall, the module member being adapted to have at least one feedthrough connector mounted thereon; (c) removably and sealably mounting an inner cover to the module member so as to seal off the interior of the pressurized vessel from the module member and the feedthrough connector when the latter is mounted on the module member and a pressure leak has occurred therethrough; and (d) removably and sealably mounting an outer cover to the mounting member so as to seal off the module member from the exterior of the pressurized vessel so that change-out or repair activities can be undertaken relative to the module member and the feedthrough connector when mounted thereon.

Also, the method includes the steps of selectively venting the inner cover for equalizing the pressure between the inner cover and the module member with the pressure at the interior of the pressurized vessel, and selectively venting the module member for equalizing the pressure between the outer cover and the module member with the pressure at the interior of the pressurized vessel. This avoids having to remove the inner cover and the module member against the pressure of the interior, since removal is preferred toward the interior.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
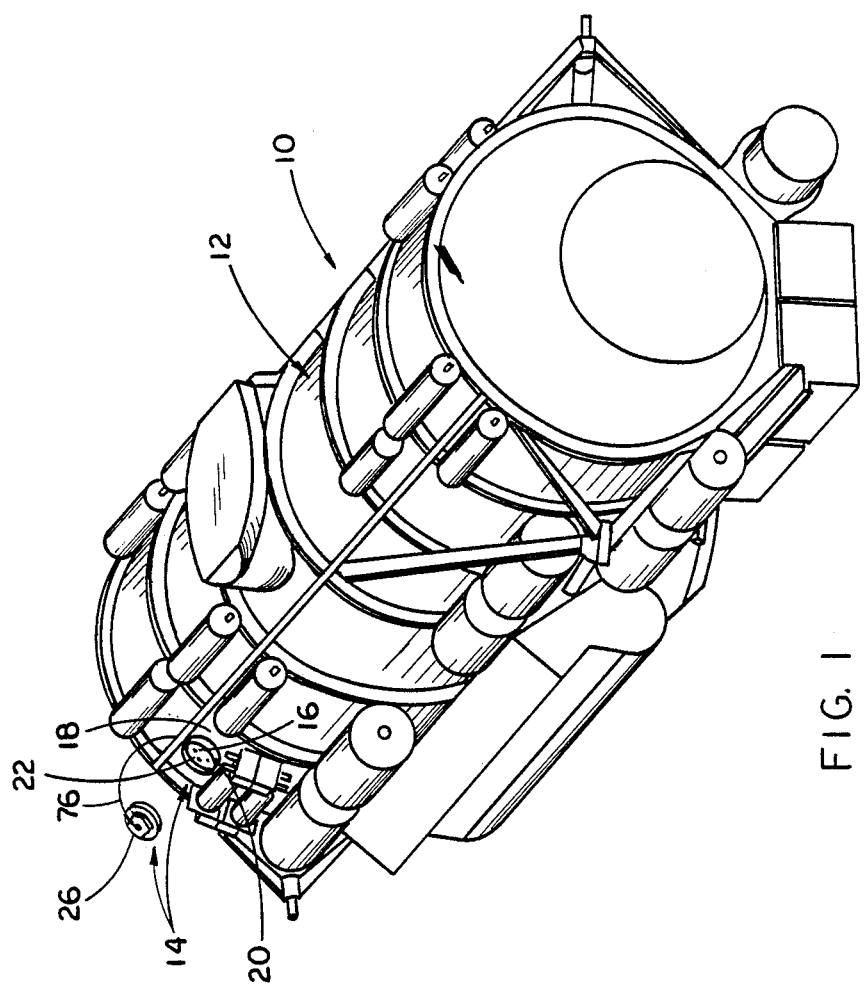
FIG. 1 is a perspective view of an industrial space facility employing the hermetic feedthrough change-out module device of the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 2:
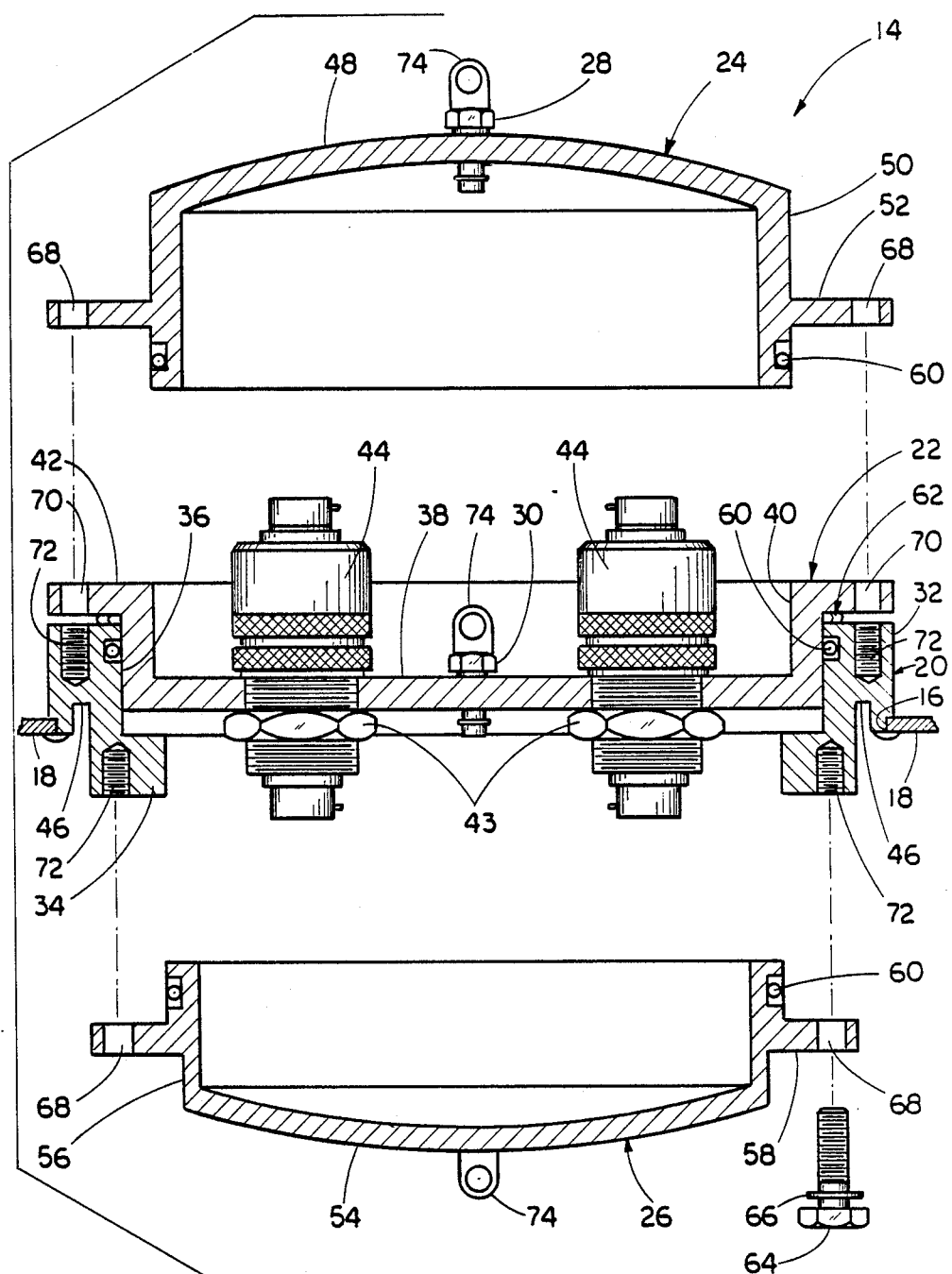
FIG. 2 is an enlarged longitudinal axial sectional view of the module device of the present invention, showing inner and outer covers of the device detached from respective removable and fixed members thereof.

Referring now to the drawings, and particularly to FIG. 1, there is shown a hermetically sealed vessel such as an industrial space facility 10 having a large cylindrical-shaped pressurized hull 12. (The space facility 10 is shown in FIG. 1 without its external meteoroid shields mounted thereon for protection from meteorites and for radiating heat.) The pressurized hull 12 of the spacecraft or facility 10 employs a hermetic feedthrough change-out module device 14, being shown in greater detail in FIG. 2, which constitutes the preferred embodiment of the present invention. The feedthrough module device 14 is mounted to the hull 12 within an access opening 16 defined through a wall 18 of the hull for facilitating routing of utility services through the opening 16 from the exterior to the interior (or vice versa) of the facility 10.

In its basic components, the feedthrough module device 14 includes a mounting member in the form of a mounting base ring 20 attached, such as by being welded, to the pressurized hull wall 18 about the access opening 16 therein, and a module member in the form of a feedthrough seal module 22 removably matable in an attached and sealing relation to the mounting base ring 20. Also, the module device 14 includes inner and outer covers 24,26 adapted to be removably mounted to the respective mounting ring 20 and seal module 22. Further, venting elements 28,30 are attached to the respective inner cover 24 and seal module 22.

More particularly, the mounting ring 20 of the module device 14 has an outer annular body 32 and inner annular peripheral flange 34 integrally connected to the end of the body 32 which extends beyond the access opening 16 and the exterior of the hull wall 18. The annular body 32 and flange 34 of the mounting ring 20 defines an interior annular seat or recess 36 within which are removably and matably received the periphery of a disk-like panel 38 of the seal module 22 and a peripheral-located annular upstanding wall 40 and radially-projecting peripheral rim 42 integrally formed thereon When the seal module 22 of the module device 14 is received within the mounting ring recess 36, the peripheral flange 34 on the mounting ring 20 is disposed outwardly from the peripheral wall 40 and the rim 42 overlaps the annular body 32 so as to prevent the internal pressure of the pressurized hull 12 (which is of course greater than the vacuum pressure of space) from forcing the seal module 22 outwardly through the access opening 16. The seal module 22 is adapted by bulkhead fittings 43 to mount one or more sealable feedthrough connectors 44 which can be any of a variety of commercially-available types being operable for attaching various utility components (not shown) thereto for routing utility services from the exterior to the interior of the pressurized hull 12. For instance, the feedthrough connectors 44 can be types for providing fluid feedthrough and rotary motion feedthrough. The module device 14 allows more conventional feedthrough connectors to be used and serviced in orbit with a very minimum loss of air which is vital both for internal atmosphere and for propulsion. Parenthetically, the mounting ring 20 also has an isolation groove 46 near the weld area to minimize distortion due to the welding of the ring 20 to the hull wall 18.

The inner cover 24 of the module device 14 includes a dome-shaped main end wall 48, an annular side wall 50 integrally connected to and extending from the end wall 48 and a radially-extending annular flange 52 surrounding and integrally connected to the side wall 50. The inner cover 24 at the exterior of its annular side wall 50 is removably mountable in sealing relation within the annular wall 40 of the seal module 22 with the annular flange 52 of the inner cover 24 disposed at the interior of and in overlying relation to the peripheral rim 42 of the seal module 22. When applied to the seal module 22, the inner cover 24 is adapted to seal off the interior of the pressurized hull 12 from the seal module 22 and the feedthrough connectors 44. Thus, should a pressure leak occur through either of the connectors 44, the leak can be isolated from the interior of the hull 12 to minimize loss of pressure.

The outer cover 26 of the module device 14, which is substantially the same in configuration to the inner cover 24, includes a dome-shaped main end wall 54, an annular side wall 56 integrally connected to and extending from the end wall 54 and a radially-extending annular flange 58 surrounding and integrally connected to the side wall 56. The outer cover 26 at the exterior of its annular side wall 56 is removably mountable in sealing relation within the annular peripheral flange 34 of the mounting ring 20 with the annular flange 58 of the outer cover 26 disposed at the exterior of and in overlying relation to the annular body 32 and peripheral flange 34 of the mounting ring 20. When applied to the mounting ring 20, the outer cover 26 is adapted to seal off the seal module 22 from the exterior of the pressurized hull 12. Thus, with the outer cover 26 installed, change-out or repair activities can be undertaken from inside of the pressurized hull 12 relative to the seal module 22 and the feedthrough connector 44 when mounted thereon.

Sealing means are provided for forming seals between the mounting ring 20 and the seal module 22, the inner cover 24 and the seal module 22, and the outer cover 26 and the mounting ring 20. The sealing means between the outer cover 26 and mounting ring 20 and between the inner cover 24 and seal module 22 are at least one and preferably a pair of O-ring seals 60. The sealing means between the mounting ring 20 and seal module 22 are at least one and preferably another pair of the O-ring seals 60 and a metal seal ring 62. The O-ring seals 60 can be of any material suitable for use in a space environment, such as a silicone elastomer or Viton.

Also, captive screws 64 with retaining rings 66 thereon are used to attach the seal module 22 to the mounting ring 20 and the inner and outer covers 24,26 to the seal module 22 and mounting ring 20. In particular, the captive screws 64 are inserted through holes 68 in the annular flanges 52,58 of the inner and outer covers 24,26 and holes 70 in the peripheral rim 42 of the seal module 22 and are then threaded into tapped bores 72 in the body 32 and flange 34 of the mounting ring 20.

The venting elements 28,30 of the module device 14 are preferably in the form of vent screws. The vent screw 28 mounted to the center of the dome-shaped end wall 48 of the inner cover 24 is selectively operable by rotating the screw 28 for equalizing the pressure at the interior of the pressurized hull 12 with the pressure between the inner cover 24 and the seal module 22. The vent screw 30 mounted to center of the disk-like panel 38 of the seal module 22 is also selectively operable by rotating the screw 30 for equalizing the pressure at the interior of the pressurized hull 12 with the pressure between the outer cover 26 and the seal module 22.

Finally, the module device 14 has gripping and tethering loops 74 attached on each of the inner and outer covers 24,26 and the seal module 22 for securing them to the hull 12 so as to prevent them from drifting away when detached from one another in a weightless spaced environment. FIG. 1 shows a tether 76 attaching the outer cover 26 to the facility hull 12. The loops 74 are adapted to be gripped by either an astronaut or a robot. The tether loops 74 on the vent screws 28,30 do not tend to become detached because all screws are intended to be captivated in their holes by retaining rings. The vent screws 28,30 do not need to be removed to operate.

The inner and outer covers 24,26 will normally not be installed on the module device 14 during normal operation of the facility 10 in space. The purpose of installing the inner cover 24 has already been mentioned above, to stop a leak in the seal module 22 or the connectors 44 mounted thereon. The outer cover 26 would be installed to facilitate replacing and/or changing the components of the feedthrough change-out module device 14 to prevent loss of pressure while such activities are being carried out.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof. It should be understood that in the preferred embodiment the design is such that removal of the seal member 22 is toward the interior of the pressurized vessel, however, by merely inverting the components of the feedthrough module device 14, the seal member 22 can be removed toward the exterior of the vessel.

I claim:

1. A hermetic feedthrough change-out module device for mounting in an access opening in a wall of a pressurized vessel, comprising:
   (a) a mounting member attachable to the pressurized vessel wall about the opening therein;
   (b) a module member removably matable in sealing relation to said mounting member, said module member being adapted to mount at least one sealable feedthrough connector which is operable for attaching utility components thereto for routing utility services from the exterior to the interior of the pressurized vessel;
   (c) an inner cover removably mountable in sealing relation to said module member for sealing off the interior of the pressurized vessel from said module member and the feedthrough connector when the latter is mounted on said module member; and
   (d) an outer cover removably mountable in sealing relation to said mounting member for sealing off said module member from the exterior of the pressurized vessel.

2. The module device as recited in claim 1, further comprising first sealing means for forming a seal between said mounting member and said module member when said module member is removably mounted thereto.

3. The module device as recited in claim 2, wherein said first sealing means is at least one of an O-ring seal and a metal seal ring.

4. The module device as recited in claim 1, further comprising second sealing means for forming a seal between said inner cover and said module member when said inner cover is removably mounted thereto.

5. The module device as recited in claim 4, wherein said second sealing means is at least one O-ring seal.

6. The module device as recited in claim 1, further comprising third sealing means for forming a seal between said outer cover and said mounting member when said outer cover is removably mounted thereto.

7. The module device as recited in claim 6, wherein said third sealing means is at least one O-ring seal.

8. The module device as recited in claim 1, further comprising first venting means mounted to said inner cover and being operable for equalizing the pressure at the interior of the pressurized vessel with the pressure between said inner cover and said module member.

9. The module device as recited in claim 1, further comprising second venting means mounted to said module member and being operable for equalizing the pressure at the interior of the pressurized vessel with the pressure between said outer cover and said module member.

10. The module device as recited in claim 1, further comprising gripping and tethering means attached on each of said inner and outer covers and said module member for securing them so as to prevent them from drifting away when in a weightless space environment.

11. The module device as recited in claim 1, wherein said module member has a peripheral rim and said mounting member has a peripheral flange which overlaps said peripheral rim on an exterior side thereof.

12. In a pressurized vessel having an access opening in a wall thereof, a hermetic feedthrough change-out module device, comprising:

(a) a mounting base ring attached to said pressurized vessel wall about said opening therein;

(b) a feedthrough seal module removably mated in sealing relation to said mounting base ring, said seal module being adapted to mount at least one sealable feedthrough connector which is operable for attaching utility components thereto for routing utility services from the exterior to the interior of the pressurized vessel;

(c) an inner cover removably mountable in sealing relation to said seal module, said inner cover being adapted to seal off the interior of the pressurized vessel from said seal module and a feedthrough connector when the latter is mounted on said seal module and a pressure leak has occurred therein;

(d) an outer cover removably mountable in sealing relation to said mounting base ring, said outer cover being adapted to seal off said seal module from the exterior of the pressurized vessel so that change-out or repair activities can be undertaken relative to said seal module and the feedthrough connector when mounted thereon;

(e) first venting means mounted to said inner cover and being operable for equalizing the pressure at the interior of the pressurized vessel with the pressure between said inner cover and said seal module; and (f) second venting means mounted to said seal module and being operable for equalizing the pressure at the interior of the pressurized vessel with the pressure between said outer cover and said seal module.

13. The module device as recited in claim 12, further comprising first sealing means for forming a seal between said mounting ring and said seal module when said seal module is removably mounted thereto.

14. The module device as recited in claim 13, Wherein said first sealing means is at least one of an O-ring seal and a metal seal ring.

15. The module device as recited in claim 12, further comprising second sealing means for forming a seal between said inner cover and said seal module when said inner cover is removably mounted thereto.

16. The module device as recited in claim 15, wherein said second sealing means is at least one O-ring seal.

17. The module device as recited in claim 12, further comprising third sealing means for forming a seal between said outer cover and said mounting ring when said outer cover is removably mounted thereto.

18. The module device as recited in claim 17, wherein said third sealing means is at least one O-ring seal.

19. The module device as recited in claim 12, further comprising gripping and tethering means attached on each of said inner and outer covers and said module member for securing them so as to prevent them from drifting away when in a weightless space environment.

20. The module device as recited in claim 12, wherein said seal module has a peripheral rim and said mounting ring has a peripheral flange which overlaps said peripheral rim on an exterior side thereof.

21. A method of replacing and/or changing a hermetic feedthrough change-out module device, comprising the steps of:

(a) providing a mounting member being fixedly attached to a wall of a pressurized vessel and extending about an access hole therein;

(b) removably and sealably mounting a module member to the mounting member so as to sealably close the access hole through the pressure vessel wall, the module member being adapted to have at least one feedthrough connector mounted thereon;

(c) removably and sealably mounting an inner cover to the module member so as to seal off the interior of the pressurized vessel from the module member and the feedthrough connector when the latter is mounted on the module member and a pressure leak has occurred therethrough; and (d) removably and sealably mounting an outer cover to the mounting member so as to seal off the module member from the exterior of the pressurized vessel so that change-out or repair activities can be undertaken relative to the module member and the feedthrough connector when mounted thereon.

22. The method as recited in claim 21, further comprising the step of selectively venting the inner cover for equalizing the pressure at the interior of the pressurized vessel with the pressure between the inner cover and the module member.

23. The method as recited in claim 21, further comprising the step of selectively venting the module member for equalizing the pressure at the interior of the pressurized vessel with the pressure between the outer cover and the module member.

* * * * *